Patented Jan. 19, 1954

2,666,766

UNITED STATES PATENT OFFICE 2,666,766

PROCESS FOR THE DEMETHYLATION OF METHOXY DERIVATIVES OF FURO-4',5',-6,7-CHROMONES

Nasry Badran, Heliopolis, Cairo, Egypt, assignor to The Memphis Chemical Co., Cairo, Egypt, an Egyptian company No Drawing. Application October 23, 1951, Serial No. 252,795

Claims priority, application Great Britain December 15, 1950

9 Claims. (Cl. 260—345.5)

This invention relates to a process for the demethylation of methoxy derivatives of furo-4',5',6,7-chromones.

Several methoxy furo-4',5',6,7-chromones occur in nature. Khellin, a major constituent of the alcohol extract of Ammi visnaga seeds, is 5,8-dimethoxy-furo - 4',5',6,7 - methylchromone. Visnagin likewise occurs in the seeds of this plant, and is 5-methoxy-furo-4',5',6,7-methylchromone.

The compounds in which the methoxyl groups of visnagin and khellin are replaced by hydroxyl groups are useful as drugs and as intermediates in the preparation of therapeutically active substances. These substances can be obtained by demethylation of khellin and visnagin and processes accomplishing this have therefore recently been the subject of considerable research. However, a demethylation process which might be applied commercially has not heretofore been available.

Clarke and Robertson, J. Chem. Soc., 1949, 302, have reported attempts to prepare dihydroxy furan chromone from khellin, employing boiling hydriodic acid freshly distilled over red phosphorus. The aqueous hydriodic acid solution, specific gravity 1.7, is added to a mixture of khellin in acetic anhydride and the resulting solution refluxed for one-half hour. However, only a resinous product was obtained which apparently contained a mixture of a large number of substances, of which only isokhellin was isolated. Clarke, Glazer and Robertson, J. Chem. Soc., 1948, 2260, refluxed visnagin with concentrated hydriodic acid in the presence of acetic anhydride, but obtained 7-hydroxy-2-methyl furan-2',3',5,6-chromone in small yield. Schonberg and Sina, J. Am. Chem. Soc., 72, 3396 (1950), obtained 5,8-dihydroxy - 2 - methylfuro-4',5',6,7-chromone by a complicated process. Khellin was heated with magnesium iodide in an ether-benzene solution. The solvent was removed in vacuo and the residue dried in the vacuum at 130° C. and then kept at 160 to 165° C. for 1½ hours. The solid was cooled, pulverized and decomposed with dilute sulfuric acid. No yield was given.

In contradistinction to these processes, the process of this invention accomplishes the demethylation of 5-methoxy derivatives of furo-4',5',6,7-chromones in good yield, is simple, straightforward and can be applied on a commercial scale.

According to the invention, 5-methoxy furo-4',5',6,7-chromones are treated at an elevated temperature with an aqueous solution of a halogen acid. The reaction proceeds at a temperature in the range from 70° C. to the reflux temperature of the aqueous acid solution and is complete in a comparatively short time, usually within one hour or less. Higher temperatures up to about 150° C. can be used if refluxing is carried out under pressure. The yield usually is over 80% and may be nearly quantitative under carefully controlled conditions.

The invention is applicable to the demethylation of 5-methoxy compounds of the following general formula:

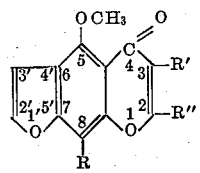

where R is hydrogen, or a methoxyl group, R' is hydrogen and R'' is selected from the group consisting of hydrogen, alkyl, such as methyl, ethyl, etc., —CH$_2$OH (methylol), and —COOH (a carboxylic group).

The reaction which occurs may be represented by the following equation:

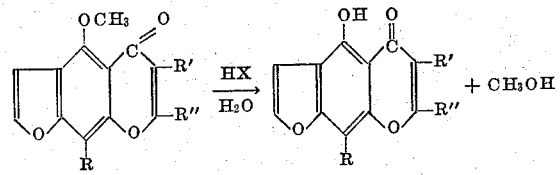

where R, R', and R'' are as defined above and X is a halogen.

It is to be noted that when R is a methoxy group demethylation nonetheless occurs only at the 5-position. Methoxy groups at the 8-position are not attacked.

The acid should be a halogen acid, i. e., hydrochloric, hydrobromic or hydriodic acid, and HX in the above equation represents such acids. The aqueous solution of the acid may contain from 10% to 75% of the acid by weight, although the concentrated acid may be used as such if the reaction time is not too long and the lower temperatures, i. e., below the reflux temperature, are used.

The following examples illustrate the process of the invention.

*Example 1*

Visnagin (1.0 gram), 15 cc. of hydrochloric acid (specific gravity 1.8) and 15 cc. of distilled water were refluxed under a water condenser for one hour. Visnagin dissolved in the reaction mixture, and after about 20 minutes a precipitate began to form, increasing gradually in amount. The mixture was allowed to cool to room temperature and then filtered. A crystalline product weighing 0.8 gram was recovered. This represents a yield of approximately 85%. This was recrystallized from glacial acetic acid, giving almost colorless crystals having a melting point of 156-158° C.

Analysis: Calculated for $C_{12}H_8O_4$: C, 66.66; H, 3.7. Found: C, 66.71; H, 3.83.

This shows that the reaction proceeded according to the following equation:

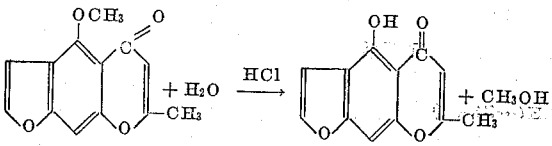

*Example 2*

Example 1 is repeated, employing 10 cc. of hydrobromic acid (specific gravity 1.46). An 85% yield is obtained of the 5-hydroxyfuro-4',5',-6,7-methyl chromone.

*Example 3*

Example 1 is repeated, employing 5 cc. of 54% hydriodic acid. An 85% yield of the 5-hydroxy-furo-4',5',6,7-methyl chromone is obtained.

*Example 4*

Khellin (1.0 gram), 15 cc. of hydrochloric acid (specific gravity 1.08) and 15 cc. of distilled water were refluxed. The chromone dissolved in the reaction mixture and after about 20 minutes a precipitate formed, which increased gradually in amount. After no further precipitate formed, the reaction was halted and the mixture allowed to cool to room temperature. The reaction required approximately one hour. The precipitate was isolated by filtration and was found to weigh 0.8 gram. This represents a yield of approximately 85%. The product was recrystallized from glacial acetic acid, giving almost colorless crystals having a melting point of 200-202° C.

Analysis: Calculated for $C_{13}H_{10}O_5$: C, 63.41; H, 4.06. Found: C 63.68; H 4.27.

The analysis shows that the reaction proceeded according to the following equation:

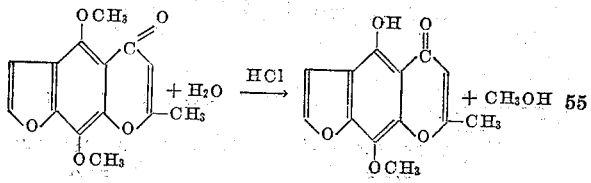

*Example 5*

Example 4 is repeated, employing 10 cc. of hydrobromic acid (specific gravity 1.46). An approximately 85% yield of the 5-hydroxy 8-methoxy-furo-4',5',6,7-chromone is obtained.

*Example 6*

Example 4 is repeated, employing 5 cc. of 54% hydriodic acid. An approximately 85% yield of the 5-hydroxy 8-methoxy-furo-4',5',6,7-methyl chromone is obtained.

The term "consists essentially in" means that the reaction is carried out in the absence of material which would interfere with it, such, for instance, as acetic anhydride, but the term does not exclude non-interfering substances not mentioned in the claims.

I claim:

1. A process of preparing 5-hydroxy furo-4',5',-6,7-chromones from the corresponding methoxy derivatives, which consists essentially in heating the chromone with an aqueous solution of an inorganic halogen acid at a temperature within the range from 70 to 150° C. at which the reaction proceeds.

2. A process of preparing 5-hydroxy furo-4',5',6,7-chromones from the corresponding methoxy derivatives, which consists essentially in heating the chromone with an aqueous solution of an inorganic halogen acid at reflux temperature within the range from 70 to 150° C.

3. A process of preparing 5-hydroxy furo-4',5',6,7-chromones from the corresponding methoxy derivatives, which consists essentially in heating the chromone with an aqueous solution of hydrochloric acid at a temperature within the range from 70 to 150° C. at which the reaction proceeds.

4. A process of preparing 5-hydroxy furo-4',5',6,7-chromones from the corresponding methoxy derivatives, which consists essentially in heating the chromone with an aqueous solution of hydrobromic acid at a temperature within the range from 70 to 150° C. at which the reaction proceeds.

5. A process of preparing 5-hydroxy furo-4',5',6,7-chromones from the corresponding methoxy derivatives, which consists essentially in heating the chromone with an aqueous solution of hydriodic acid at a temperature within the range from 70 to 150° C. at which the reaction proceeds.

6. A process for preparing a 5-hydroxy-furo-4',5',6,7-chromone which consist essentially in heating 5-methoxy-furo-4',5',6,7-chromone with an aqueous solution of an inorganic halogen acid at a temperature within the range from 70 to 150° C. at which demethylation occurs, whereby the methoxyl group in the 5-position is replaced by the hydroxyl group.

7. A process in accordance with claim 6 in which the inorganic acid is hydrochloric acid and the chromone is visnagin.

8. A process of preparing a 5-hydroxy-8-methoxy-furo-4',5',6,7-chromone, which consists essentially in heating a 5,8-dimethoxy-furo-4',5',-6,7-chromone with an aqueous solution of an inorganic halogen acid at a temperature within the range from 70 to 150° C. at which demethylation occurs, whereby the methoxyl group at the 5-position is replaced by a hydroxyl group.

9. A process in accordance with claim 8 in which the inorganic acid is hydrochloric acid and the chromone is khellin.

NASRY BADRAN.

References Cited in the file of this patent

Clark et al., J. Chem. Soc. (1949) page 302.
Clark et al., J. Chem. Soc. (1948) page 2260.